Figure 1:
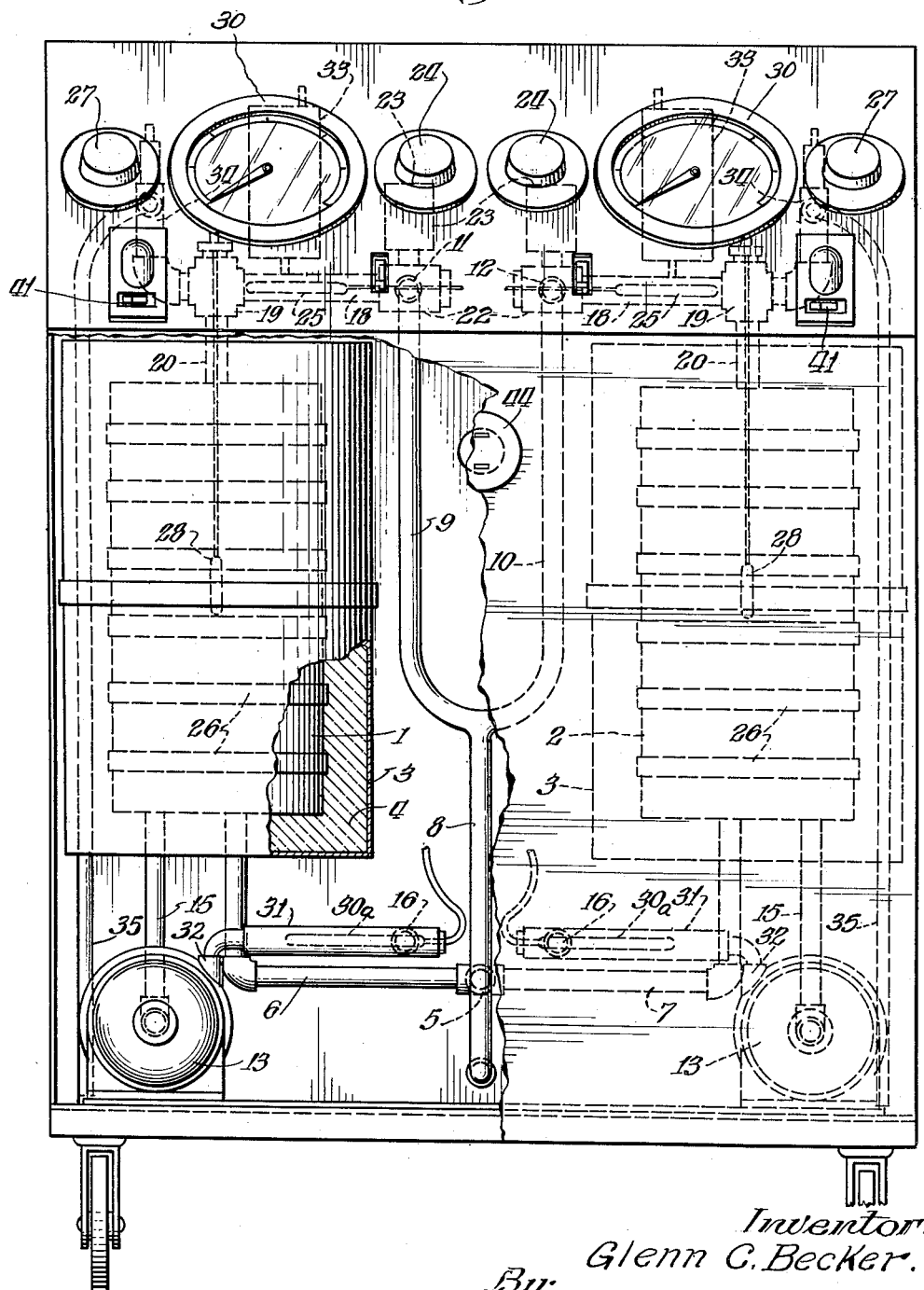

June 3, 1952  G. C. BECKER  2,598,966
TEMPERATURE REGULATING WATER CIRCULATOR
FOR MOLDING PRESSES AND OTHER PURPOSES
Filed May 16, 1950  2 SHEETS—SHEET 1

Inventor:
Glenn C. Becker.
By:
Evans, Pond & Anderson
attys.

Inventor:
Glenn C. Becker.
By: Evans, Paul & Anderson
attys.

Patented June 3, 1952

2,598,966

UNITED STATES PATENT OFFICE 2,598,966

TEMPERATURE REGULATING WATER CIRCULATOR FOR MOLDING PRESSES AND OTHER PURPOSES

Glenn C. Becker, Chicago, Ill., assignor to Vacuum Can Company, Chicago, Ill., a corporation of Illinois Application May 16, 1950, Serial No. 162,235

4 Claims. (Cl. 219—39)

1

This invention relates to a water heating and circulating device designed for the purpose of supplying and circulating hot water to the molding dies employed in molding plastic material, but the equipment may have many other useful applications, in general, in any situation where temperature is to be controlled by a flow of water (or other liquid) heated to a predetermined temperature.

The main objects of the invention are to provide a water-heating and circulating device, whereby a substantially constant flow of hot water may be maintained; to provide a water heating and circulating device whereby the temperature of the water may be effectively regulated and maintained within a few degrees of a predetermined temperature; to provide a device of the character indicated which is portable so that it may be readily moved from one place to another and which may be readily connected to and disconnected from molding presses or other apparatus with which the device is associated; to provide a device of the character indicated of compact form and small over-all size, but which will, nevertheless, provide adequate water heating capacity for the purpose indicated; and to provide a device of the character indicated, which will be low in cost of production and operation, while at the same time, being highly practical and efficient for its purpose.

Other objects and advantages of the invention will be understood by reference to the following specification and accompanying drawings (two sheets), wherein there is disclosed a water heating and circulating device embodying a selected form of the invention.

Figure 2:
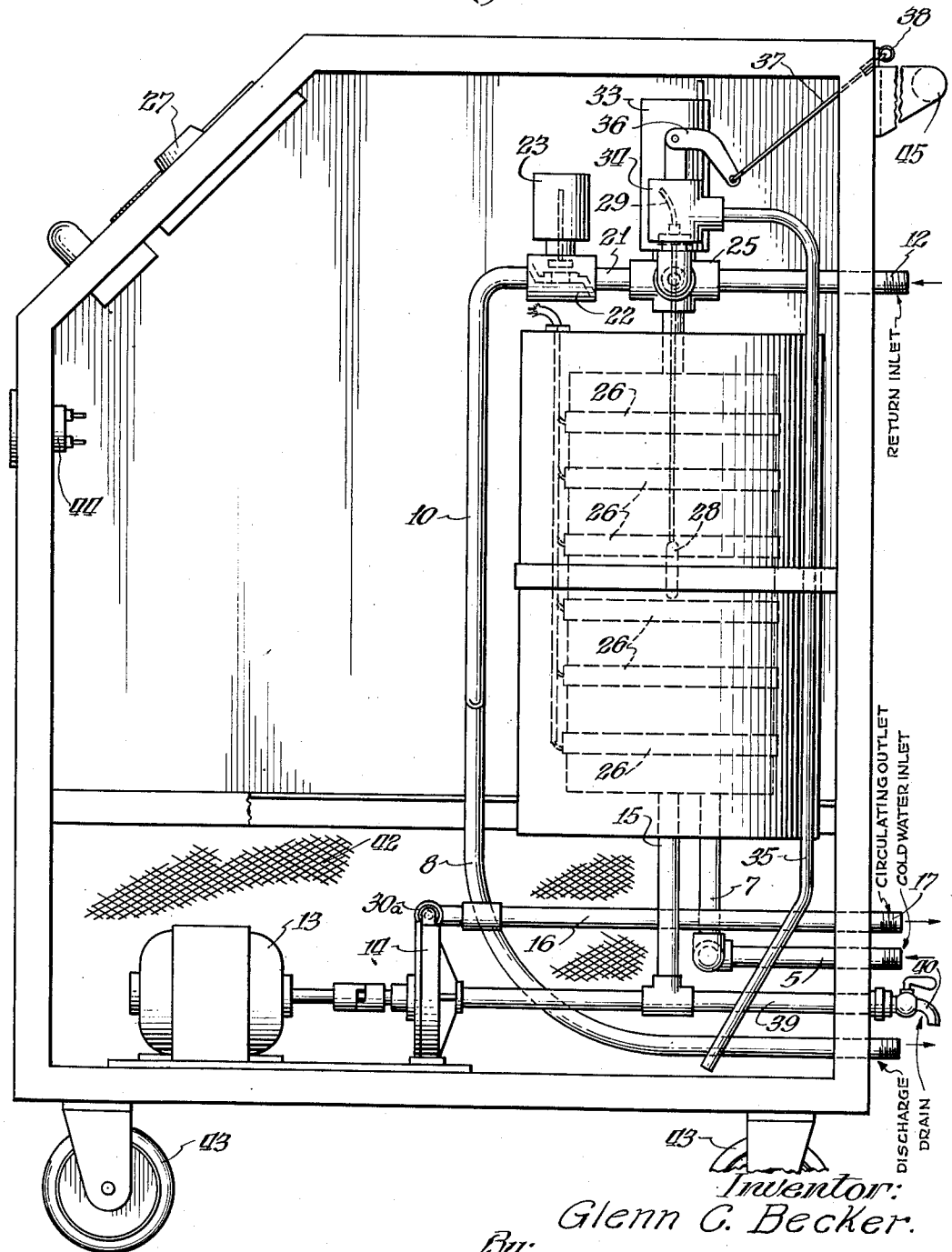

In the drawings:

Figure 1 is a front elevation, certain parts being broken away and shown in section to reveal certain details; and Figure 2 is a side view, a side closure plate having been removed to clearly disclose parts of the structure enclosed within a cabinet which contains most of the mechanism.

The water heating and circulating device shown in the drawings is a double unit embodying a pair of tanks 1 and 2. These tanks 1 and 2 may be made of stainless steel or any other suitable metal, and they are each enclosed in outer containers 3 and an insulating jacket 4 located between the inner containers 1 and 2 respectively, and the outer containers 3. The tanks 1 and 2 are interconnected only through the agency of a cold water inlet pipe 5, which has branches 6 and 7 respectively leading to the bottoms of the tanks 1 and 2, and through the agency of a discharge pipe 8, which has branches 9 and 10 connected through suitable piping to independent hot water inlets 11 and 12 for the tanks 1 and 2 respectively. Except for the foregoing connecting piping, the tanks 1 and 2 and other apparatus associated with the respective tanks are independent of each other.

2

Each of the tanks 1 and 2 has associated therewith an electric motor 13, which drives a rotary water pump 14 having its intake port connected to the bottom of the tank through a pipe 15. The water is discharged from the pump through a pipe 16, which has an end portion 17 projecting out of the cabinet, which contains the tanks and other elements of the apparatus. The projecting end portion 17 of the hot water outlet pipe is threaded for receiving suitable pipe or hose fittings, whereby this outlet pipe may be connected to the inlet of a molding die water chamber or the like.

Cold water is admitted into the bottom of each tank through the cold water inlet pipe 5 and the branch 6 or 7, previously referred to, the pipe also having an end portion projecting outside of the cabinet to facilitate connection of said inlet pipe to a source of cold water. In normal operation, the tanks are connected through the inlet pipe 5 to a source of cold water under pressure which will tend to cause cold water to flow into said tanks to replace any water lost from the tanks or apparatus to which the device is connected. Once the tanks and connected apparatus are filled, the supply pressure has no effect except to effect replacement of lost water as just explained. Water which is delivered to the molding die heating chamber or other apparatus is returned to the tank from which it came, through hot water inlet pipes 11 or 12 for the respective tanks and flows through a conduit 18, a fitting 19, and a nipple 20 into the top of the tank 1 or 2. The hot water return pipes 11 and 12 are each extended, as indicated at 21, and connected to a valve 22 to which the branch 9 or branch 10 of the discharge pipe 8 is connected. This valve 22 is normally closed and held closed by spring means enclosed in the structure of the valve, and it is adapted to be opened by energization of a solenoid 23. The solenoid 23 is included in an electric circuit with an adjustable thermostat represented at 24, which may be adjusted to cause closing of the electric circuit including the solenoid 23, whenever the temperature of the water flowing through the pipe 11 or 12 back into the tank 1 or 2 reaches a predetermined, maximum temperature. Operation of the thermostat 24, which may be referred to as a cooling thermostat, is controlled by a thermostat bulb 25, which is located in the conduit 18 through which the hot water flows in the course of its return to the tank 1 or 2.

If the temperature of the return water should reach the maximum temperature to which the thermostat 24 is set, the solenoid 23 will be energized and valve 22 opened, thereby permitting at least a portion of the hot water to flow through the valve 22 into the discharge line 8, thereby automatically permitting cold water to enter through the inlet 5 and branches 6 or 7 into the tank 1 or 2. By mixing fresh, cold water with the water contained in the tank, the temperature will, of course, be lowered. When the lowered temperature is reflected by action on the thermostat bulb 25, the circuit to the solenoid 23 will, of course, be broken, permitting the solenoid to be automatically closed by the spring action above mentioned, whereupon the further escape or discharge of hot water will be prevented and the return water directed back to the tank 1 or 2 for re-circulation.

Heating of the water contained in the tanks is effected by means of a plurality of electrical heating bands, indicated at 26, these bands being located at more or less uniformly spaced locations along the length of the tank, so as to thereby effectively distribute the heat generated in these heating bands. These heating bands may be of any suitable electrical construction, the details of which are known and not a part of the present invention.

All of the heating bands 26 on one tank are interconnected and an electric circuit to such heating bands is controlled by a thermostat 27, which is connected to a thermostat bulb 28 located in the tank. This bulb has a stem extending upwardly through the fitting 19, whereby the bulb is suspended in the proper location in the tank (preferably approximately midway between the top and bottom of the tank), and the usual tube connection between the bulb and the thermostat extends out of the upper end of the fitting, as indicated at 29, such connection extending to the thermostat 27 in the usual manner. The thermostat 27 is adjustable so that it may be set for any selected temperature within a predetermined range. This thermostat is normally adjusted to a predetermined, minimum temperature so that when the temperature of water in the tank falls below the selected temperature, the electric circuit to the heating bands, which is controlled by such thermostat, will be closed, thereby to energize said heating bands and to heat the water contained in the tank. These heating bands are located around the outside of the tank and are not immersed in the water. The tanks being made of stainless steel or similar non-corroding material are very efficient heat conductors, so that the heat developed by the heating bands will readily be transmitted to the contents of the tank.

When the water temperature within the tank rises to or slightly above the temperature set on the thermostat, the electric circuit to the heating bands will be broken so as to stop the further heating of the water. Inasmuch as the tanks 1 or 2 are enclosed in efficient insulating material, heat loss is kept low, and in given instances, the heat developed in the molding press or other equipment, will transmit enough heat to the water circulated therethrough to fully off-set heat losses in the circulating system, so that the electrical heating bands are seldom energized, and the main function of the device becomes that of lowering the temperature of the water circulated. However, in other instances, the heating bands will be kept energized for a substantial portion of the operating time in order to maintain the circulating liquid at the required temperature. A thermometer 30 is mounted on the front panel of the cabinet structure and is connected to a thermometer bulb 30a located in a pipe fitting 31, which connects the outlet port 32 of the pump 14 to the hot water outlet pipe 16. Hence, the temperature of the water being pumped to the molding press or other apparatus is constantly registered on the visible dial of the thermometer to facilitate the determination of existing operating conditions, and to afford a basis for the exercise of judgment as to adjustment of the settings of the maximum and minimum temperature limits on the thermostats 24 and 27 respectively.

The tanks 1 and 2 may be of fairly small capacity, for example, around 1 or 1½ gallons, so that the total volume of water in the circulating system is not unduly increased by the employment of the circulating device; this also aids in the matter of varying the temperature of the water, and in maintaining said temperature within one or two degrees of predetermined maximum and minimum temperatures.

A suitable air vent 33 is connected to the fitting 18 to permit the escape of any air which may separate from the water in the tank. This air vent may be of any suitable construction of which many are known, being such as to permit the escape of air without corresponding escape of liquid from the system. Relief valves 34 are connected through the fittings 18 and 19 into the return pipes 11 and 12. These relief valves have discharge pipes 35 extended downwardly to the bottom of the cabinet and are provided as a precautionary measure to relieve pressure in the respective tanks, in the event that some unforseen cause creates excessive pressure in the system. The bottom of the cabinet is open, or at least may be provided with an opening, so that in the event that any water is discharged through outlet 35, it will simply flow to the floor.

To assist in initially charging the tank with water, the pressure relief valves 34 may be manually opened through means such as a lever arm 36 which may be actuated through a pull rod 37, the latter extending to the outside of the cabinet and being provided with a handle ring 38. By opening this pressure relief valve when initially filling the device, the air contained in the tank will be given somewhat more free escape than through the air vent 33, and the operator of the device will receive a signal that the tank is full when water issues from the lower end of the discharge pipe 35. For draining the system, for cleaning and other purposes, a drain pipe 39 is connected to the hot water outlet line 15, and extended to the outside of the cabinet where it is provided with a suitable drain-cock 40. This drain-cock is located in the lowest part of the system and the air vent and pressure relief valve are located in the uppermost part of the system for most advantageous operation.

The cabinet which encloses and supports the described mechanism may be of any suitable construction, being here represented as consisting of angle iron frame work and suitable sheet metal walls supported by the frame work. The instruments, such as the thermostats and thermometers, may be mounted on angularly-disposed panel portions at the front of the cabinet so as to provide clear visibility, and a main switch 41 for each pump motor may also be mounted on such front panel. The switch 41 may be of the type embodying a signal light which will afford visual indication as to the operation of the pump motors. In some instances, it is desirable that the lower portions of the side walls of the cabinet be formed of suitable, perforated metal or screening, as indicated at 42, to provide ventilation for the interior of the cabinet. The cabinet structure may be mounted on suitable rollers or caster wheels such as indicated at 43, and a handle 45 may be fastened to the back wall of the cabinet, near the top thereof, to facilitate movement of the cabinet from place to place. One part 44 of a separable electrical connector may be fastened to a suitable part of the cabinet, such as the front wall, for the reception of the companion part of the connector on a flexible, electrical conductor cord of suitable gauge to handle the current required by the motors and heating bands. The electrical connections are of conventional form, being well understood by skilled electricians, wherefore they are not herein shown.

The described double, or twin, circulating unit provides separate circulating systems which may be connected to the heating (or cooling) chambers of the upper and lower dies of a plastic or other molding press and hence, affords independent control of the temperatures of the co-operating dies. In some instances, where only one die is to be heated in a press, the twin structure here described may serve two, independent presses, the respective tanks 1 and 2 being then accordingly connected to the different presses. Either unit may be operated alone, when only one unit is required for a given purpose.

The various pipe lines and fittings employed in the structure may advantageously be made of non-corroding metals such as brass or bronze, thereby to avoid the development of excessive amounts of scale in the system, which would reduce the efficiency thereof. Inasmuch as each tank is of small capacity, as aforesaid, it may readily be flushed clean occasionally, such flushing requiring only a few minutes of time.

The structure described may be used with special advantage in connection with the molding of transparent plastic materials which appear to require somewhat more critical regulation of the temperature than opaque and colored materials. When molding clear, transparent materials, it is especially important to avoid scorching of the material, which would impart color and cloudiness, thereby making useless the resulting products when clear and transparent products are required. The accurate control of temperature is, of course, advantageous in many situations and is easily attained by the described structure.

Various changes in the structure may be made while retaining the general features of the invention described and the principles thereof.

I claim:

1. Water circulating apparatus of the class described, comprising a tank, a cold water inlet conduit connected to said tank, means for heating water in said tank, an outlet conduit extending from said tank and adapted to be connected to a temperature controlling chamber or the like, a return conduit connected to said tank and adapted to be connected to such chamber for returning temperature controlling liquid from such chamber to said tank, a branch conduit extending from said return conduit and having a valve therein normally closing said conduit, and means controlled by the temperature of the fluid for effecting opening of said valve to permit the escape of fluid from said return conduit and the flow of cold water into said tank through said cold water inlet.

2. Water circulating apparatus of the class described, comprising a tank, a cold water inlet conduit connected to said tank, means for heating water in said tank, an outlet conduit extending from said tank and adapted to be connected to a temperature controlling chamber or the like, a return conduit connected to said tank and adapted to be connected to such chamber for returning temperature controlling liquid from such chamber to said tank, a branch conduit extending from said return conduit and having a valve therein normally closing said conduit, and thermostatically controlled means responsive to the temperature of water in said return conduit for effecting opening of said valve to permit the escape of hot water from said return conduit, thereby to permit the flow of cold water into said tank through said cold water inlet.

3. In water heating and circulating apparatus of the class described, the combination of a tank, a water supply conduit connected to said tank and adapted to be connected to a water supply source for delivering water to said tank, means for heating water in said tank, outlet and return conduits connected to said tank and adapted to be connected to a temperature controlling chamber, a pump connected in one of said last mentioned conduits for effecting circulation of water from and to said tank through said outlet and return conduits and a temperature controlling chamber or the like to which said conduits are connected as aforesaid, an air vent connected to an upper portion of said tank and operative to vent gas from said tank without permitting the escape of liquid therefrom, and a pressure relief conduit and valve communicating with the upper end portion of said tank.

4. In water heating and circulating apparatus of the class described, the combination of a tank, a water supply conduit connected to said tank and adapted to be connected to a water supply source for delivering water to said tank, thermostatically controlled electrical means for heating water in said tank, outlet and return conduits connected to said tank and adapted to be connected to a temperature controlling chamber, a pump connected in one of said last mentioned conduits for effecting circulation of water from and to said tank through said outlet and return conduits and a temperature controlling chamber or the like to which said conduits are connected as aforesaid, an air vent connected to an upper portion of said tank and operative to vent gas from said tank without permitting the escape of liquid therefrom, a discharge conduit communicating with said return conduit, a valve in said discharge conduit, means responsive to the temperature of the water returning to said tank for actuating said discharge conduit valve to effect discharge of returning water and, as an incident thereto, delivery of replacement water to said tank through said water supply conduit, and a pressure relief conduit and valve communicating with the upper end portion of said tank.

GLENN C. BECKER.

REFERENCES CITED

The following references are of record in the file of this patent:

UNITED STATES PATENTS

| Number | Name | Date |
|---|---|---|
| 1,931,145 | Hall | Oct. 17, 1933 |
| 1,983,043 | Martin | Dec. 4, 1934 |
| 2,091,838 | Staak | Aug. 31, 1937 |
| 2,226,526 | Osterheld | Dec. 24, 1940 |
| 2,259,401 | Tucker et al. | Oct. 14, 1941 |